(12) United States Patent
Gueu et al.

(10) Patent No.: US 11,262,273 B2
(45) Date of Patent: Mar. 1, 2022

(54) METHOD FOR DETERMINING AN OPTICAL PARAMETER OF A LENS

(71) Applicant: ESSILOR INTERNATIONAL, Charenton-le-Pont (FR)

(72) Inventors: Stephane Gueu, Charenton-le-Pont (FR); Julien Andoche, Charenton-le-Pont (FR); Daniel Tang, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/955,431

(22) PCT Filed: Dec. 20, 2018

(86) PCT No.: PCT/EP2018/086143
§ 371 (c)(1),
(2) Date: Jun. 18, 2020

(87) PCT Pub. No.: WO2019/122096
PCT Pub. Date: Jun. 27, 2019

(65) Prior Publication Data
US 2020/0408635 A1  Dec. 31, 2020

(30) Foreign Application Priority Data
Dec. 21, 2017 (EP) .................................. 17306860

(51) Int. Cl.
*G01M 11/02* (2006.01)
*G06K 9/00* (2022.01)
(Continued)

(52) U.S. Cl.
CPC .... *G01M 11/0228* (2013.01); *G01M 11/0207* (2013.01); *G06K 9/00604* (2013.01);
(Continued)

(58) Field of Classification Search
None
See application file for complete search history.

(56) References Cited

U.S. PATENT DOCUMENTS

| 2018/0106700 A1 | 4/2018 | Limon et al. |
| 2018/0140182 A1 | 5/2018 | Limon et al. |
| 2018/0224675 A1 | 8/2018 | Gueu et al. |

FOREIGN PATENT DOCUMENTS

| EP | 3 128 362 A1 | 2/2017 |
| KR | 10-2006-0093596 A | 8/2006 |
| WO | WO 2016/181309 A1 | 11/2016 |

OTHER PUBLICATIONS

International Search Report dated Feb. 22, 2019 in PCT/EP2018/086143 filed on Dec. 20, 2018, 11 pages.

*Primary Examiner* — Edward Park
(74) *Attorney, Agent, or Firm* — Oblon, McClelland, Maier & Neustadt, L.L.P.

(57) ABSTRACT

A method implemented by computer means for determining at least one optical parameter of a lens of eyewear adapted for a person, the method comprising: —an image reception step, during which at least a first image and a second image are received, the first image comprising a front view of the face of the person with at least one part of an eye of the person being directly visible, and the second image comprising a front view of the face of the person with said part of the eye of the person being visible through at least part of the lens, and —an optical parameter determination step, during which at least one optical parameter of the lens is determined based on a comparison between said part on the first and the second image.

15 Claims, 7 Drawing Sheets

(51) Int. Cl.
*G06K 9/22* (2006.01)
*G06K 9/62* (2022.01)
*G06Q 30/06* (2012.01)

(52) U.S. Cl.
CPC ............ *G06K 9/22* (2013.01); *G06K 9/6201* (2013.01); *G06Q 30/0633* (2013.01)

METHOD FOR DETERMINING AN OPTICAL PARAMETER OF A LENS

FIELD OF THE INVENTION

The invention relates to a method implemented by computer means for determining at least one optical parameter of a lens of eyewear adapted for a person, to a method for ordering a lens of eyewear adapted for a person, to a computer program product able to perform the method of the invention and to a system comprising at least a reception unit, an electronic storage medium and a processing unit, the electronic storage medium carrying the instructions of the computer program product.

BACKGROUND OF THE INVENTION

Usually, a person wishing to have an optical equipment goes over to an eye care practitioner.

The eye care practitioner orders the eyewear equipment at an optical lab by sending an order request to the optical lab. The order request may comprise wearer data, for example the wearer's prescription, fitting data, spectacle frame data, for example the type of spectacle frame the wearer has selected, and lens data, for example the type of optical lens the wearer has selected.

The determination of the wearer's prescription and fitting data may require carrying out complex and time-consuming measurements. Such measurements usually require complex and costing material and qualified personnel to be carried out.

Such measurements are usually carried out even when the person's optical needs have not changed. For example, a person that wants to order a new frame with the same optical lenses than with his/her previous spectacles may have to go through the tedious process indicated previously.

Indeed, some fitting data are directly linked to the frame. In addition, regarding the wearer's prescription and other wearer data such as the pupillary distance, the results of former measurements by the eye care practitioner may be lost.

The eye care practitioner may use lens mapper and/or lens meter to determine the optical features of the current optical lenses of the optical equipment of the person. However, such devices still require going to the eye care practitioner since there are very expensive and require qualified person to be used. In other words, the person himself may not use such devices to determine the parameters to be included in the order request. Typically, such devices are not available when a person wishes to order a new optical equipment over the internet.

Therefore, there is a need to a method and a device that would allow a person to quickly, easily and at low cost determine optical parameters of his/her current optical equipment.

One object of the present invention is to provide such method.

SUMMARY OF THE INVENTION

To this end, the invention proposes a method implemented by computer means for determining at least one optical parameter of a lens of eyewear adapted for a person, the method comprising:

an image reception step, during which at least a first image and a second image are received, the first image and the second image each comprise a front view of the face of the person with at least one part of an eye of the person being visible, and said part of the eye of the person is visible through at least part of the lens at least on the second image, and an optical parameter determination step, during which at least one optical parameter of the lens is determined based on a comparison between said part on the first and the second image.

Advantageously, the invention allows a person to determine optical parameters of his/her current equipment quickly, easily, at low cost and without a professional's assistance.

According to further embodiments of the optical device according to the invention which can be considered alone or in combination:

during the image reception step, the first image comprises a front view of the face of the person with at least one part of an eye of the person being directly visible, and the second image comprises a front view of the face of the person with said part of the eye of the person being visible through at least part of the lens; and/or during the image reception step, the first image and the second image both comprise a front view of the face of the person with at least one part of an eye of the person being visible through at least part of the lens, the first image corresponds to a first eye-lens distance between the lens and said part of the eye, the second image corresponds to a second eye-lens distance between the lens and said part of the eye, and the second eye-lens distance is different from the first eye-lens distance; and/or during the optical parameter determination step, the optical parameter of the lens is determined based on a comparison on the deformation of said part of the eye between the first and the second image; and/or on the second image, the person is wearing the eyewear with the lens, or holding the eyewear with the lens in front of his face; and/or said part of the eye includes iris or pupil; and/or on the first image, an object with at least one known dimension, such as a credit card, is positioned in the same plane as said part of the eye of the person; and/or on the second image, an object of at least one known dimension, such as a credit card, is positioned in a plane tangent to the lens at a reference point chosen on the front surface of said lens; and/or during the image reception step, a third image is received, the third image comprising a view of the eyewear positioned on a flat surface along with an object with at least one known dimension, such as a credit card; and/or during the image reception step, a fourth image is received, the fourth image comprising a side view of the face of the person, wearing the eyewear, said part of the eye of the person is directly visible; and/or during the image reception step, a fifth image is received, the fifth image comprising a side view of the face of the person wearing the eyewear; and/or the invention further comprises a first image acquisition step, during which the first image is acquired by a portable electronic device comprising an image acquisition module; and/or the invention further comprises a lens positioning step, during which the lens is positioned relatively to said part of the eye of the person at a position corresponding to the second image; and/or the invention further comprises a second image acquisition step during which the second image is acquired by the portable electronic device comprising the image acquisition module; and/or the invention further comprises, prior to the first image acquisition step, a first lens positioning step, during which the lens is positioned relatively to said part of the eye of the person at a position corresponding to the first image; and/or the invention further comprises a third image acquisition step for acquiring the third image by a portable electronic device comprising an image acquisition module; and/or the invention further comprises a fourth image acquisition step for acquiring the fourth image by the portable electronic device; and/or the invention further comprises a fifth image acquisition step for acquiring the fifth image by the portable electronic device; and/or the invention further includes a scaling step, during which, when the person wears the optical equipment, the distance between said part of the eye of the person and the lens, and the distance from which the lens is seen on at least one image received during the image reception step are determined relatively to at least one known dimension, and during the optical parameter determination step, the at least one optical parameter of the lens is determined based on the distance between said part of the eye of the person and the lens, and the distance from which the lens is seen on at least one image received during the image reception step; and/or the first image and the second image are acquired in similar viewing conditions; and/or the first image, the second image and the fourth image are acquired in similar viewing conditions; and/or the invention further includes a viewing condition reception step, during which at least a first viewing condition and a second viewing condition are received, the first viewing condition being associated to the first image and the second viewing condition being associated to the second image; and/or during the viewing condition reception step, a third viewing condition is received, the third viewing condition being associated to the third image; and/or during the viewing condition reception step, a fourth viewing condition is received, the fourth viewing condition being associated to the fourth image; and/or during the viewing condition reception step, a fifth viewing condition is received, the fifth viewing condition being associated to the fifth image; and/or the invention further includes a viewing condition determination step, during which at least a first viewing condition and a second viewing condition are determined, the first viewing condition being associated to the first image and the second viewing condition being associated to the second image; and/or during the viewing condition determination step, a third viewing condition is determined, the third viewing condition being associated to the third image; and/or during the viewing condition determination step, a fourth viewing condition is determined, the fourth viewing condition being associated to the fourth image; and/or during the viewing condition determination step, a fifth viewing condition is determined, the fifth viewing condition being associated to the fifth image; and/or the viewing condition includes a lighting parameter; and/or the viewing condition includes a refraction parameter; and/or the viewing condition includes a reflection parameter; and/or during the optical parameter determination step, the at least one optical parameter of the lens is determined based on the lighting parameter of at least two of the first image and the second image and the fourth image; and/or the portable electronic device is a smartphone, a personal digital assistant, a laptop, a webcam or a tablet computer; and/or the optical parameter of the lens comprises the dioptric function of the optical lens; and/or the optical parameter of the lens comprises the optical power in a visual reference zone of the optical lens; and/or the optical parameter of the lens comprises the optical cylinder in a visual reference zone of the optical lens; and/or the optical parameter of the lens comprises the optical cylinder axis in a visual reference zone of the optical lens; and/or the optical parameter of the lens comprises the prism base in a visual reference zone of the optical lens; and/or the optical parameter of the lens comprises the prism axis in a visual reference zone of the optical lens; and/or the optical parameter of the lens comprises the type of optical design of the optical lens; and/or the optical parameter of the lens comprises the transmittance of the optical lens; and/or the optical parameter of the lens comprises the color of the optical lens.

Another object of the invention is a method for ordering a lens of eyewear adapted for a person, comprising:

an optical parameter determining step, during which at least one optical parameter of the lens is determined by a method implemented by computer means for determining at least one optical parameter of a lens of eyewear adapted for a person according to the invention, and an ordering step, during which a lens having the at least one determined optical parameter is ordered.

Another object of the invention is a computer program product comprising one or more stored sequences of instructions which, when executed by a processing unit, are able to perform the parameter determining step of the method according to the invention.

Another object of the invention is a system comprising at least a reception unit, an electronic storage medium and a processing unit, the reception unit, the electronic storage medium and the processing unit being configured so as to communicate one with another, the reception unit being able to receive a first and a second image, the first image comprising a front view of the face of the person with said part of the eye of the person being directly visible, and the second image comprising a front view of the face of the person with said part of the eye of the person being visible through at least part of the lens, and the electronic storage medium comprising one or more stored sequences of instructions which, when executed by the processing unit, are able to perform an optical parameter determination step, during which at least one optical parameter of a lens is determined based on a comparison between at least one part of an eye of a person on the first and the second image.

The invention further relates to a computer program product comprising one or more stored sequences of instructions that are accessible to a processor and which, when executed by the processor, causes the processor to carry out at least the steps of the method according to the invention.

The invention also relates to a computer-readable storage medium having a program recorded thereon; where the program makes the computer execute at least the steps of the method of the invention.

The invention further relates to a device comprising a processor adapted to store one or more sequences of instructions and to carry out at least steps of the method according to the invention.

BRIEF DESCRIPTION OF THE DRAWINGS

Non-limiting embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF THE DRAWINGS

The invention relates to a method implemented by computer means for determining at least one optical parameter of a lens of eyewear adapted for a person.

The at least one optical parameter of the lens may include the type of lens, such as single vision, bifocal or progressive.

The at least one optical parameter of the lens may include at least one parameter of the dioptric function of the lens.

The at least one optical parameter of the lens may include at least one parameter of the optical design of the lens, such as the distribution of optical power on the surface of the lens.

The lens may include a progressive lens and the at least one optical parameter of a lens may include at least one of the following: corridor, far vision and near vision points, sphere, cylinder, cylinder axis, prism base, prism axis, transmittance and color.

The at least one optical parameter of the lens may be determined for a visual reference zone of the lens. The visual reference zone may generally correspond to an upper or a lower zone of the lens.

Figure 1A:
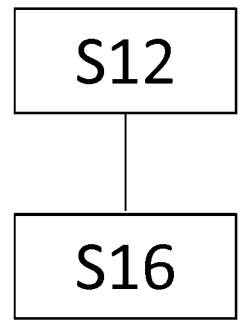
FIGS. 1A, 1B and 1C are schematic diagrams of the steps of a method for determining an optical parameter of a lens according to embodiments of the invention.
Figure 1B:
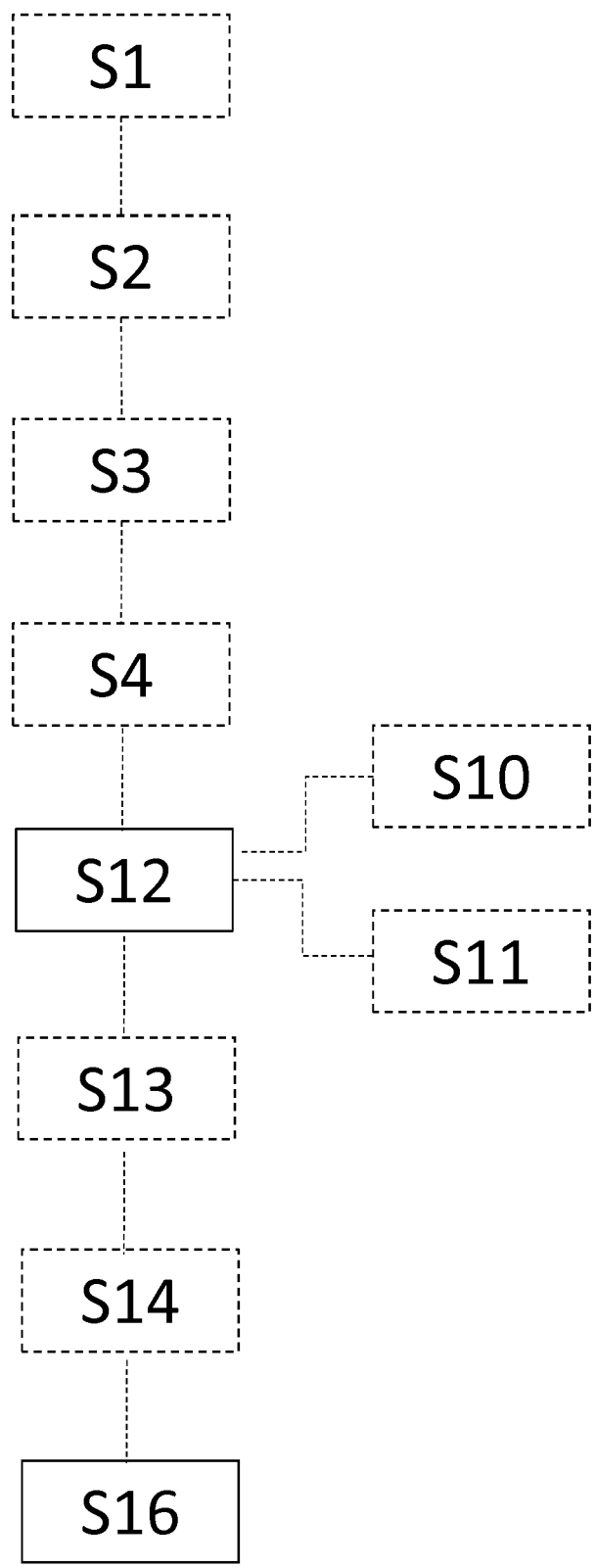
Figure 1C:
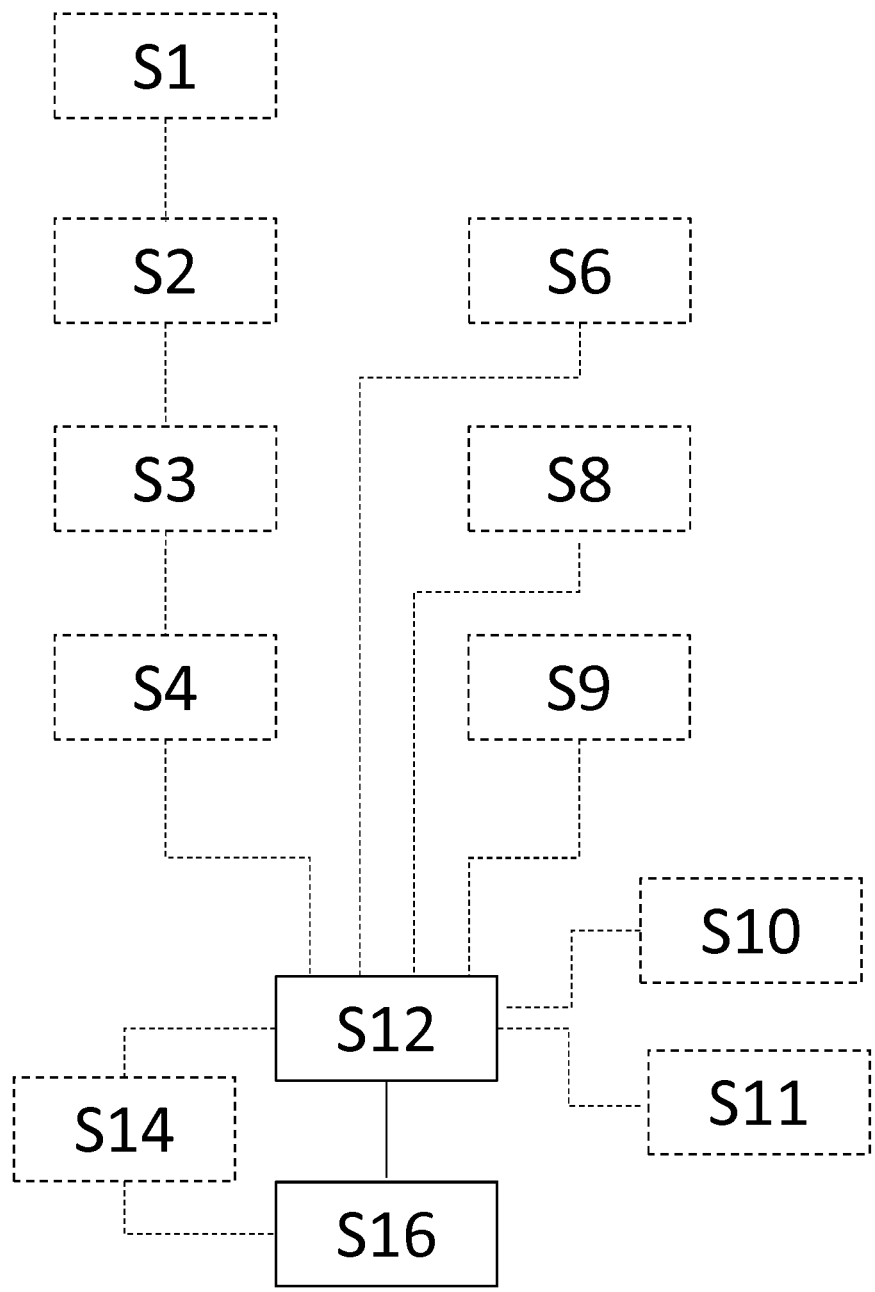

As illustrated on FIG. 1, the method comprises at least an image reception step S12 and an optical parameter determination step S16.

During the image reception step S12, at least a first image and a second image are received.

By image is understood any image type or image format. Images include two-dimensional images or three-dimensional images such as depth maps generated from stereo images, from light-field images or from video.

The first image and the second image each comprise a front view of the face of the person with at least one part of an eye of the person being visible. Said part of the eye of the person is visible through at least part of the lens at least on the second image.

Figure 2A:
FIGS. 2A-2E show examples of images received during the reception step of a method according to an embodiment of the invention.
Figure 2B:
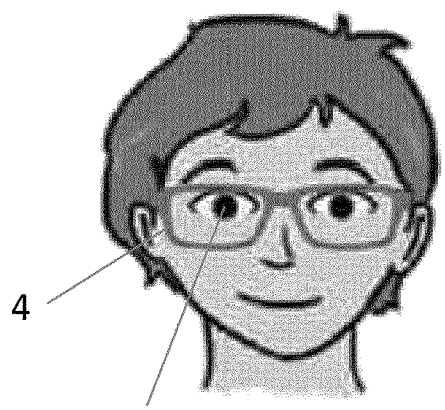

In some embodiments, on the first image said part 2 of the eye of the person is directly visible, as illustrated on FIG. 2A.

In other embodiments, on the first image and the second image both comprise a front view of the face of the person with at least one part 2 of an eye of the person being visible through at least part of the lens 4, the first image corresponds to a first eye-lens distance between the lens 4 and said part 2 of the eye, the second image corresponds to a second eye-lens distance between the lens 4 and said part 2 of the eye, and the second eye-lens distance is different from the first eye-lens distance.

By view is understood a graphical projection of a three-dimensional object onto a planar surface which is referred to in this document as a plan image.

On an image comprising a front view of the face of the person, the positioning of the iris within the eye corresponds to a gaze direction perpendicular to the plan image.

An object such as said part 2 of the eye of the person being directly visible on an image is understood as said object being separated from the plan image by a straight line which is not interrupted by any physical obstacle.

Said part 2 of the eye of the person being seen through at least part of the lens 4 is understood as being present on the second image behind said at least part of the lens 4.

Said part 2 of the eye of the person may include the iris or the pupil. A particularly advantageous effect is that the determination of the shape and dimensions of the iris and of the pupil is easy and accurate due to a high contrast difference between the iris and the white of the eye and/or, depending on the color of the iris, between the pupil and the iris.

On the second image, the person may be wearing an eyewear with the lens 4.

Alternatively, the person may be holding an eyewear with the lens 4 at a distance in front of his face. Said distance may for example be measured by any method known to the person skilled in the art. Said distance could be for example equal to the length of the temple of the frame.

An increased distance between said part 2 of the eye of the person and the lens 4 results in an increased deformation of said part 2 of the eye of the person on the second image, compared to the first image. Provided that the increased deformation does not lead to said part 2 of the eye of the person appearing too small on the second image with respect to the resolution of the second image, a better accuracy of the method is reached.

During the optical parameter determination step S16, at least one optical parameter of the lens is determined based on a comparison between said part 2 on the first and the second image.

For example, by comparing the color of said part 2 of the eye on the first and the second image, it is possible to determine optical parameters of the lens related to color.

According to an embodiment, said optical parameter of the lens is determined based on a comparison on the deformation of said part 2 of the eye of a person between the first image and the second image. In the sense of the invention, deformation is a change in dimensions and/or in shape.

In the case where the first image comprises a direct view of the part 2 of the eye of the user, the algorithm used to perform the optical parameter determination step S16 requires values of the following distances:
 the distance between said part 2 of the eye and the image acquisition module used to acquire the first image while the first image was acquired, and
 the distance between said part 2 of the eye and the lens 4 while the second image was acquired.

In the case where both the first and the second image comprise a view of the part 2 of the eye of the user through the lens 4, the algorithm used to perform the optical parameter determination step S16 requires values of the distance between the lens 4 and the image acquisition module used to acquire the first image while the first image was acquired and of the distance between the lens 4 and the image acquisition module used to acquire the second image while the second image was acquired.

In the case where the first image and the second image are both depth maps or other images obtained by mapping or facial recognition technologies, such as the technologies implemented in Kinect or Face ID, the images may comprise depth information, thus the required values may be enclosed in the images, extracted from the image data and determined relatively to each other.

In the case where the first image and the second image are both two-dimensional images such as photographs, the required values may be determined either relatively to each other or as absolute numerical values.

The required values may be predetermined, for example at least one default value may be entered.

Alternatively, the required values may be input manually by the person.

Alternatively, the required values may be selected in a database, based on manual inputs by the person and/or based on at least one image.

Alternatively, according to another embodiment, the method according to the invention may further include a scaling step S14.

During the scaling step S14, the required values for the calculations are determined relatively to at least one known dimension. The required values are determined based at least on the first and the second images. Said known dimension is to be understood as either the known length of an object, or the known distance between two objects.

The required values for the calculations may be determined based on calibration. Calibration consists in using an object whose size is known to know the dimension of other objects in a photo.

An object having one known dimension may be a credit card, or any object which may be referenced in a database comprising a list of objects and at least their corresponding lengths. An example of such objects is a spectacle frame. In this case, the person may for example select the spectacle frame he/she is wearing in a database comprising a list of spectacle frames and their corresponding lengths. Some dimensions of the frame may also be read directly on the frame. In this example, the calibration can be done directly during the acquisition of at least the first and second images.

Alternatively, an object having one known dimension may be an object which itself is calibrated with another object having one known dimension.

Figure 2C:
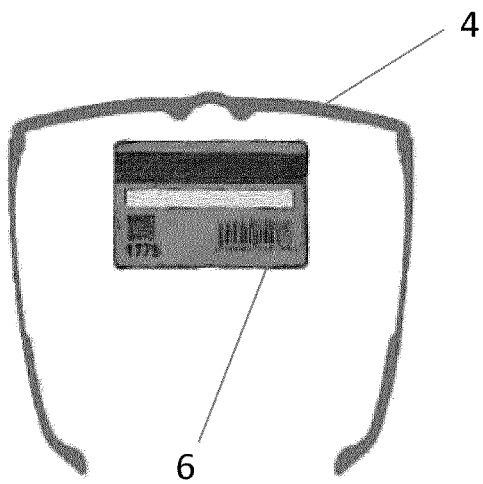

According to an embodiment, during the image reception step S12, a third image may be received, the third image comprising, as illustrated on FIG. 2C, a view of the eyewear comprising the lens 4. The eyewear is positioned on a flat surface along with an object 6 with at least one known dimension, such as a credit card. Thus the absolute dimensions and shape of the eyewear may be determined and the eyewear may be further used, on other images, as a scale. Advantageously, this image may be used to perform a calibration of the spectacle frame prior to the scaling step S14.

The following example illustrates an embodiment of the invention in which the method comprises a scaling step S14.

Figure 5A:
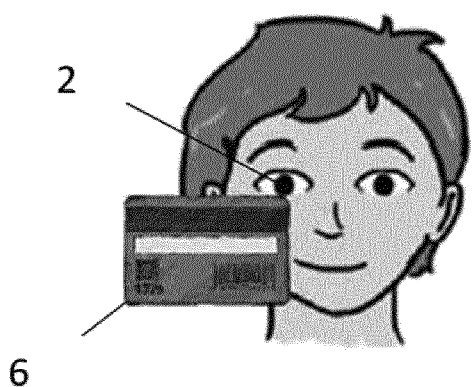
Figure 5B:
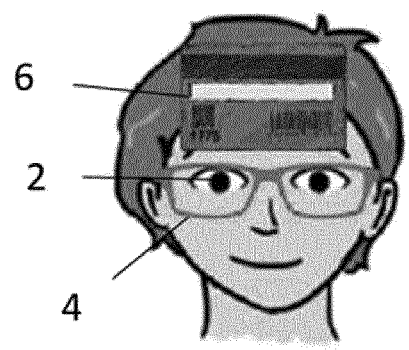

In this example, during the reception step S12, three images corresponding to the following description are received:
 the first image, as illustrated on FIG. 5A, is a front view of the person having a spectacle frame at the level of his forehead and a credit card positioned in the same plane as a part 2 of the eye of the person, the first image is acquired by an image acquisition module positioned at a distance d1 from the part 2 of the eye of the person,
 the second image, as illustrated on FIG. 5B, is a front view of the person having the spectacle frame on his nose so that the lens 4 is before the part 2 of the eye of the person and a credit card positioned in a plane tangent to the lens 4 at a reference point chosen on the front surface of said lens 4, the second image is acquired by an image acquisition module positioned a distance d2 from the part 2 of the eye of the person, and
 the third image is a front view of the person having the spectacle frame at the level of his forehead, the third image is acquired by an image acquisition module positioned a third distance d3 from the part 2 of the eye of the person.

Any of the distances d1, d2 and d3 may be equal to or different from each other.

In this example, the credit card is an object 6 of one known dimension, this known dimension is in the same plane as the part 2 of the eye of the person on the first image. Therefore the credit card may be used to determine the dimensions of said part 2 of the eye of the person on the first image.

Moreover, in this example, the known dimension of the credit card is in a plane tangent to the lens 4 at a reference point chosen on the front surface of said lens 4 on the second image. Therefore, the dimensions of the spectacle frame are calibrated with the credit card based on the second image, thus the spectacle frame is also an object of at least one known dimension, which may be used to determine the dimensions of said part 2 of the eye of the person as seen on the second image.

Furthermore, either the credit card or the spectacle frame may be used to determine characteristic dimensions of the face of the person.

In this example, during the scaling step S14, the distance d1 between said part 2 of the eye and the image acquisition module used to acquire the first image while the first image was acquired, and the distance between said part 2 of the eye and the lens 4 while the second image was acquired are determined based on the acquired images.

In this example, during the optical parameter determination step S16, at least one optical parameter of the lens is determined based on a comparison between said part 2 on the first and the second image and based on the distances determined during the scaling step S14.

The method may further include an image data providing step S13.

During the image data providing step S13, image data are provided for the first and the second images. The image data comprise a dimension relating at least to characteristics, such as settings or technical specifications, of the image acquisition device used to acquire each image.

Figure 4:
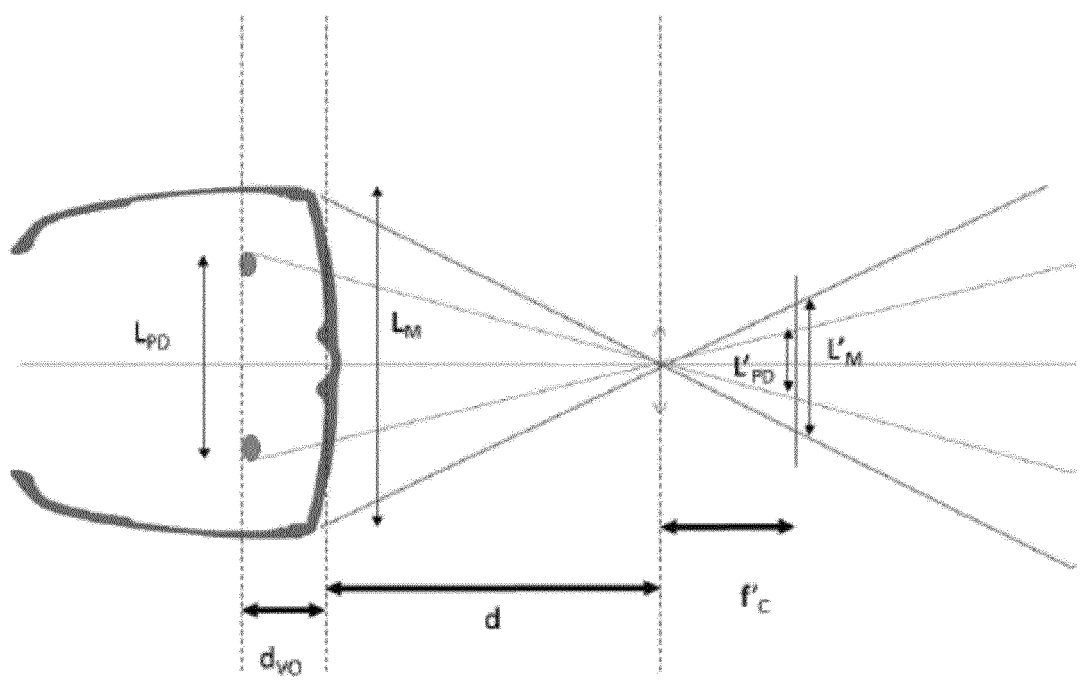
FIGS. 4 and 5A-5B show examples of images received during the reception step comprising an object with at least one known dimension, according to an embodiment of the invention.

In the following example illustrated on FIG. 4, we consider the following dimensions or distances:

$L_{PD}$ is the interpupillary distance of the person, $L_M$ is the length of an object, here a spectacle frame of eyewear with the lens 4, $L'_{PD}$ is, in the plan image of the second image, the distance corresponding to the interpupillary distance of the person, $L'_M$ is, in the plan image of the second image, the distance corresponding to the length of the object on the second image, $d_{VO}$ is the distance between the optical lens and the part 2 of the eye of the person, d is the distance between the lens 4 and the lens of the image acquisition device which acquired the second image, and $f'_C$ is the focal length of the lens of the image acquisition device, represented as a pinhole camera, which acquired the second image.

Among these values, the required distances for the calculations during the optical parameter determining step S16 are $d_{VO}$ and d.

$L'_M$ and $L'_{PD}$ are dimensions which may be determined directly from the second image. $f'_C$ is a dimension related to the image acquisition device.

$L_{PD}$ may be a known dimension, for example separately provided, measured, or determined in a similar manner from the first image if the first image comprises a view of both eyes directly seen.

$d_{VO}$ may be determined using the equation $d_{VO}=d(L_{PD}/L'_{PD} \times L'_M/L'_M - 1)$.

Figure 2D:
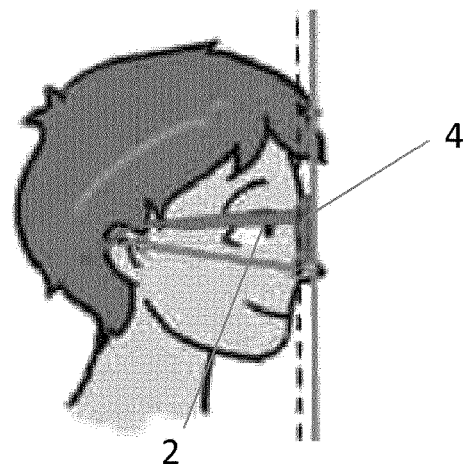

According to an embodiment, during the image reception step S12, a fourth image may be received. The fourth image comprises, as illustrated on FIG. 2D, a side view of the face of the person, with the lens 4 being in the same position with regard to said part 2 of the eye as on the first image.

By side view is understood a view in which the head of the person is oriented to the side. In other words, on the fourth image, the center of said part 2 of the eye and the center of the lens 4 are on a straight line substantially parallel to the plan image.

Advantageously, characteristic side-view dimensions on the head of the person may be determined. In particular, through the association of the third and the fourth image, characteristic side-view dimensions on the head of the person may be scaled relatively to the dimensions of the eyewear.

On the fourth image, said part 2 of the eye of the person may be directly visible. Advantageously, in this case the distance between said part 2 of the eye of the person and the lens 4 may be determined. In particular, through the association of the third and the fourth image, the distance between said part 2 of the eye of the person and the lens 4 may be scaled relatively to the dimensions of the eyewear.

Figure 2E:

According to an embodiment, during the image reception step S12, a fifth image may be received, the fifth image comprising, as illustrated on FIG. 2E, a side view of the face of the person, wherein said part 2 of the eye is directly visible.

Advantageously, if said part 2 of the eye is not directly visible on the fourth image, it is possible from the fifth image to determine the position of said part 2 of the eye of the person on the fourth image as if it was directly visible.

Thus, the distance between the lens 4 and said part 2 of the eye may be determined. It may be assumed that this distance is the same on every image where the person is wearing the eyewear, for example on the second image.

In addition, the method according to the invention may further include a viewing condition reception step S10.

During the viewing condition reception step, at least two viewing conditions associated to different images may be received. The viewing conditions may be metadata included in an image. Advantageously, viewing conditions associated to every image may be received.

Viewing conditions may include a lighting parameter, which may include at least a value in a radiometry unit or in a photometry unit.

Viewing conditions may include a reflection parameter. For example, an image may be reflected from a mirror.

In an embodiment, the viewing conditions are similar for the first image and the second image.

Alternatively, the method according to the invention may further include a viewing condition determination step S11.

During the viewing condition determination step, at least two viewing conditions associated to different images may be determined. As an example of a viewing condition, a lighting parameter, such as brightness, may be determined by image treatment of at least part of an image. Advantageously, viewing conditions associated to every image may be determined.

For this reason, it is possible to use some characteristic distances measured on the face to determine a ratio factor between different images.

The viewing conditions may also include the distance between the image acquisition module and an element such as the lens 4 or the part 2 of the eye of the person while each image is acquired. Indeed, such distances may be different from an image to another.

The scaling step S14 and/or the optical parameter determination step S16 may also be adapted based on the viewing conditions.

For example, if the face has not the same size in photo 1 without glasses and photo 2 with eyeglasses, this implies that the distance between the image acquisition module and the face has changed. A ratio factor may thus be calculated to take into account for the power calculation.

Alternatively, differences in viewing conditions, such as brightness, between two images may result in a deformation of the part 2 of the eye, the deformation being independent from the lens 4. Thus the difference in apparent shape or dimensions of the image of said part of the eye on different images may be corrected from the variations in the viewing conditions.

Figure 3A:
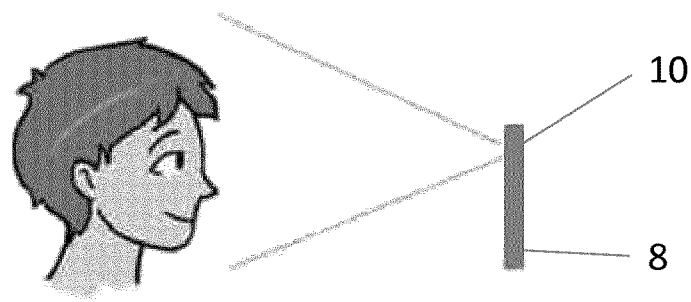
FIGS. 3A-3D show examples of image acquisition steps of a method according to an embodiment of the invention.

In an embodiment, the method according to the invention may also comprise a first image acquisition step S2, as illustrated on FIG. 3A, during which a first image is acquired by a portable electronic device 8 comprising an image acquisition module 10.

Figure 5C:
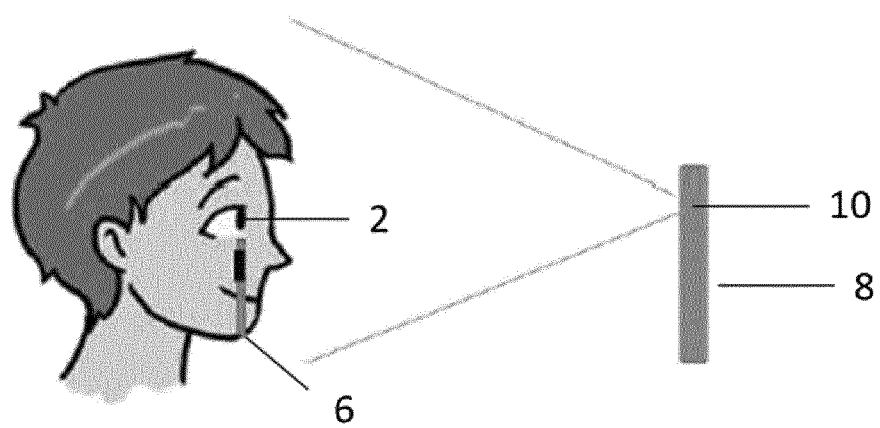
FIGS. 5C-5D show examples of image acquisition steps, wherein the images show an object with at least one known dimension, according to an embodiment of the invention.

FIG. 5C illustrates a specific embodiment in which during the first image acquisition step S2, an object 6 of at least one known dimension is positioned so that on the first image, said part 2 of the eye of the person and at least one known dimension of the object 6 are in the same plane.

In an embodiment, the portable electronic device 8 is a smartphone, a personal digital assistant, a laptop, a webcam or a tablet computer. The portable electronic device may comprise a battery, and may communicate with a reception unit, for example by wireless communication. Advantageously, the image acquisition step S2 may be carried out easily in any location.

The method may comprise a lens positioning step S3, during which the lens 4 is positioned relatively to said part 2 of the eye of the person at a position corresponding to the second image.

Figure 3B:
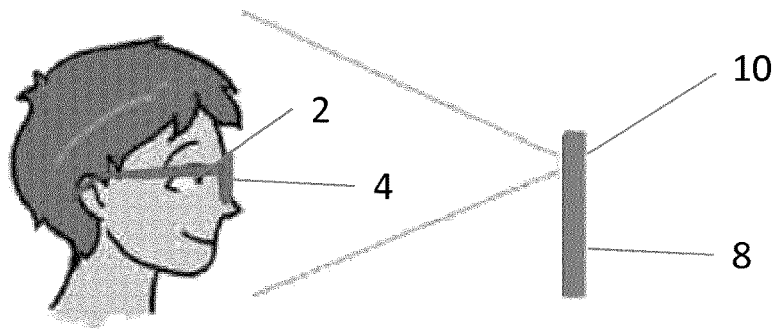

The method may comprise a second image acquisition step S4, as illustrated on FIG. 3B, during which a second image is acquired by the portable electronic device 8 comprising the image acquisition module 10, wherein the image acquisition module 10 is positioned at a second distance from the lens 4.

During the second image acquisition step S4, the face of the person, the lens 4 and the image acquisition module 10 are positioned in such a way that said part 2 of the eye of the person is visible from the image acquisition module 10 through at least part of the lens 4.

In an embodiment, the method further comprises, prior to the first image acquisition step S2, a first lens positioning step S1, during which the lens 4 is positioned relatively to the part 2 of the eye of the person at a position corresponding to the first image. Thus the invention allows a person to determine optical parameters of his/her eyewear for example by simply using his/her smartphone, or another portable electronic device, to take a series of images of his/her face with and without eyewear, then having the images processed.

Figure 5D:
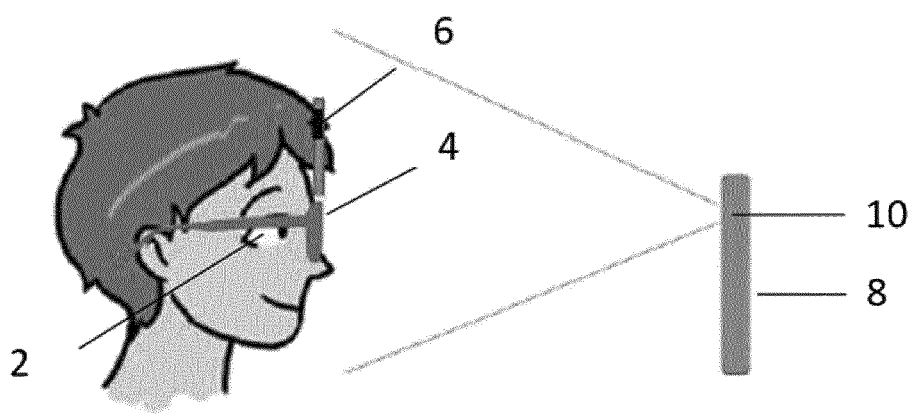

As illustrated on FIG. 5D, during the second image acquisition step S4, a reference element with at least one known dimension in a plane may be positioned so that on the second image the known dimension is in a plane tangent to the lens 4 at a reference point chosen on the front surface of said lens 4.

Advantageously, the method according to the invention may include a third image acquisition step S6 for acquiring a third image by a portable electronic device 8 comprising an image acquisition module 10.

Figure 3C:
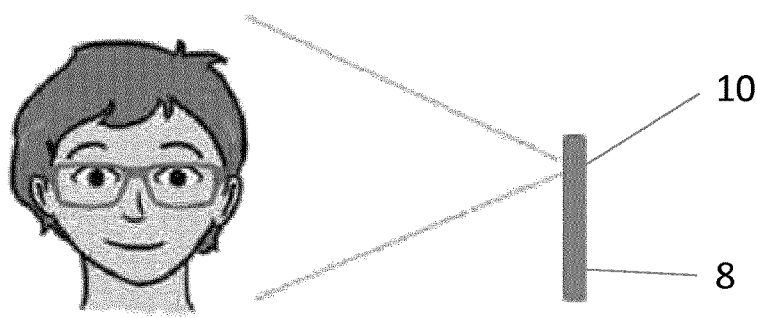

Advantageously, the method according to the invention may include a fourth image acquisition step S8, as illustrated on FIG. 3C, for acquiring a fourth image by a portable electronic device 8 comprising an image acquisition module 10.

Figure 3D:
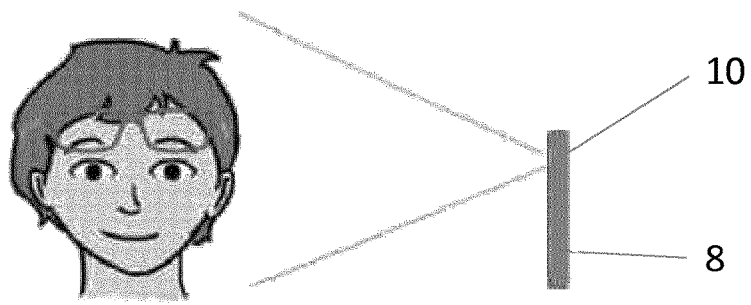

Advantageously, the method according to the invention may include a fifth image acquisition step S9, as illustrated on FIG. 3D for acquiring a fifth image by a portable electronic device 8 comprising an image acquisition module 10.

Figure 6:
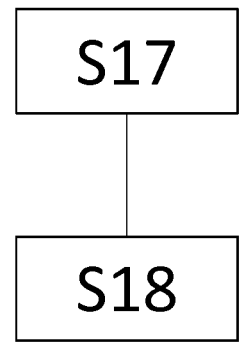
FIG. 6 is a schematic diagram of the steps of a method for ordering a lens of eyewear adapted for a person according to the invention.

The invention may further relate to a method for ordering a second lens of eyewear adapted for a person, as illustrated on FIG. 6.

The method comprises at least an optical parameter determining step S17 and an ordering step S18.

During the optical parameter determining step S17, at least one optical parameter of a first lens is determined by a method according to the invention, as illustrated on FIG. 1.

During the ordering step S18, a second lens having the at least one determined optical parameter of the first lens is ordered.

The invention may further relate to a computer program product comprising one or more stored sequences of instructions which, when executed by a processing unit 20, are able to perform at least the optical parameter determining step S16 of the invention.

Figure 7:
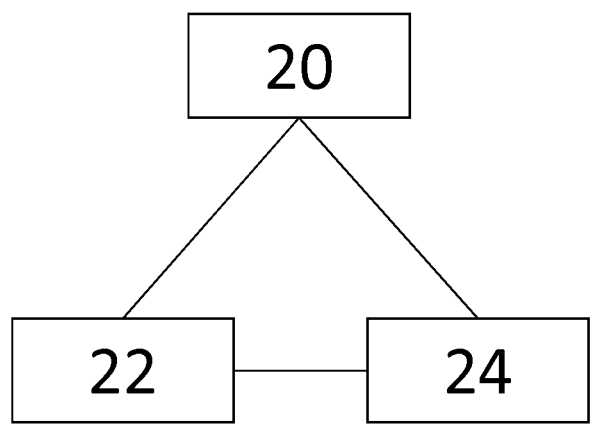
FIG. 7 is a schematic diagram of a system comprising at least a reception unit, an electronic storage medium and a processing unit, the electronic storage medium carrying the instructions of a computer program product able to perform a method according to the invention.

The invention may further relate, as illustrated on FIG. 7, to a system comprising at least a reception unit 22, an electronic storage medium 24 and a processing unit 20, the reception unit 22, the electronic storage medium 24 and the processing unit 20 being configured so as to communicate one with another, the reception unit 22 being able to receive a first image and a second image, the first image comprising a front view of the face of the person with said part 2 of the eye of the person being directly visible, and the second image comprising a front view of the face of the person with said part 2 of the eye of the person being visible through at least part of the lens 4, and the electronic storage medium 24 comprising one or more stored sequences of instructions which, when executed by the processing unit 20, are able to perform an optical parameter determination step S16, during which at least one optical parameter of a lens 4 is determined based on a comparison between at least one part 2 of an eye of a person on the first image and the second image.

The system may further comprise image acquisition means configured so as to communicate at least with the reception unit, the image acquisition means being able to acquire the first image and the second image.

Examples of such systems may include a smartphone, a laptop computer, a desktop computer, a tablet computer or a personal digital assistant.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by computer means for determining at least one optical parameter of a lens of eyewear adapted for a person, the method comprising:

an image reception step, during which at least a first image and a second image are received, the first and second images are depth maps comprising depth information, the first image and the second image each comprise a front view of a face of the person with at least one part of an eye of the person being visible, and said part of the eye of the person is visible through at least part of the lens on the second image, an optical parameter determination step, during which first and second image data are extracted from respective depth information and compared together to determine at least one optical parameter of the lens.

2. The method according to claim 1, wherein during the image reception step,
the first image comprises a front view of the face of the person with at least one part of an eye of the person being directly visible, and
the second image comprises a front view of the face of the person with said part of the eye of the person being visible through at least part of the lens.

3. The method according to claim 1, wherein during the image reception step,
the first image and the second image both comprise a front view of the face of the person with at least one part of an eye of the person being visible through at least part of the lens,
the first image corresponds to a first eye-lens distance between the lens and said part of the eye,
the second image corresponds to a second eye-lens distance between the lens and said part of the eye, and
the second eye-lens distance is different from the first eye-lens distance.

4. The method according to claim 1, further comprising:
a first image acquisition step, during which the first image is acquired by a portable electronic device comprising an image acquisition module,
a lens positioning step, during which the lens is positioned relatively to said part of the eye of the person at a position corresponding to the second image, and
a second image acquisition step during which the second image is acquired by the portable electronic device comprising the image acquisition module.

5. The method according to claim 4, further comprising prior to the first image acquisition step:
a first lens positioning step, during which the lens is positioned relatively to said part of the eye of the person at a position corresponding to the first image.

6. The method according to claim 4, wherein during the image reception step, a third image is received, the third image comprising a side view of the face of the person, wearing the eyewear, wherein said part of the eye of the person is directly visible.

7. The method according to claim 6, wherein during the image reception step, a fourth image is received, the fourth image comprising a side view of the face of the person, wherein the person is wearing the eyewear.

8. The method according to claim 7, further comprising:
acquiring a fifth image including a view of the eyewear positioned on a flat surface along with an object with at least one known dimension by a portable electronic device comprising an image acquisition module,
acquiring the third image comprising the side view of the face of the person, wearing the eyewear, wherein said part of the eye of the person is directly visible, by the portable electronic device,
a fourth image acquisition step for acquiring the fourth image comprising the side view of the face of the person, wherein the person is wearing the eyewear, by the portable electronic device.

9. The method according to claim 1, wherein said part of the eye includes iris or pupil.

10. The method according to claim 1, wherein on the first image, an object with at least one known dimension, such as a credit card, is positioned in the same plane as said part of the eye of the person.

11. The method according to claim 10, further including:
a scaling step, during which, when the person wears the eyewear,
a distance between said part of the eye of the person and the lens, and
the distance from which the lens is seen on at least one image received during the image reception step
are determined relatively to at least one known dimension,
and wherein during the parameter determination step, the at least one optical parameter of the lens is determined based on
the distance between said part of the eye of the person and the lens, and
the distance from which the lens is seen on at least one image received during the image reception step.

12. The method according to claim 1, wherein on the second image, an object of at least one known dimension, such as a credit card, is positioned in a plane tangent to the lens at a reference point chosen on the front surface of said lens.

13. The method according to claim 1, wherein during the image reception step, a third image is received, the third image comprising a view of the eyewear positioned on a flat surface along with an object with at least one known dimension.

14. A method for ordering a lens of eyewear adapted for a person, comprising:
an optical parameter determining step, during which at least one optical parameter of the lens is determined by the method according to claim 1, and
an ordering step, during which an lens having the at least one determined optical parameter is ordered.

15. A system comprising at least a receiver, an electronic storage medium, and a processor,
the receiver, the electronic storage medium and the processor being configured to communicate one with another,
the receiver being able to receive a first and a second image,
the first image is a depth map comprising depth information and comprising a front view of the face of a person with part of an eye of the person being directly visible, and
the second image is a depth map comprising depth information and comprising a front view of the face of the person with said part of the eye of the person being visible through at least part of a lens, and
the electronic storage medium comprising one or more stored sequences of instructions which, when executed by the processor, are able to perform an optical parameter determination step, during which first and second image data are extracted from respective depth information and compared together to determine at least one optical parameter of a lens.

* * * * *